(12) United States Patent
Chu

(10) Patent No.: US 9,066,074 B2
(45) Date of Patent: Jun. 23, 2015

(54) CAMERA MODULE TESTING DEVICE

(71) Applicant: HON HAI PRECISION INDUSTRY CO., LTD., New Taipei (TW)

(72) Inventor: Chih-Hao Chu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 125 days.

(21) Appl. No.: 13/967,353

(22) Filed: Aug. 15, 2013

(65) Prior Publication Data

US 2014/0198223 A1 Jul. 17, 2014

(30) Foreign Application Priority Data

Jan. 14, 2013 (TW) .............................. 102101264 A

(51) Int. Cl.
*H04N 17/00* (2006.01)
*G03B 43/00* (2006.01)

(52) U.S. Cl.
CPC .............. *H04N 17/002* (2013.01); *G03B 43/00* (2013.01)

(58) Field of Classification Search
CPC ... G03B 43/00; H04N 17/002; H04N 17/004; H04N 17/00
See application file for complete search history.

(56) References Cited

U.S. PATENT DOCUMENTS

| 7,110,022 | B2* | 9/2006 | Aoyama | 348/187 |
| 8,749,770 | B2* | 6/2014 | Peng et al. | 356/124 |
| 2012/0229652 | A1* | 9/2012 | Lee et al. | 348/187 |
| 2014/0198223 | A1* | 7/2014 | Chu | 348/187 |

* cited by examiner

*Primary Examiner* — W B Perkey
(74) *Attorney, Agent, or Firm* — Novak Druce Connolly Bove + Quigg LLP

(57) ABSTRACT

A camera module testing device for detecting light leakage in relation to a camera module includes a base, a first fixing plate, a second fixing plate, a movable element, a stepping motor, a sliding table, a support mechanism, a board and a power supply module, and a processing unit. The movable element includes a first movable plate, a second movable plate, and a third movable plate. The support mechanism and the camera module are driven to rotate to various predetermined angles. The stepping motor drives movable element, the support mechanism and the camera module to swing a predetermined number times for each predetermined angle. The lens captures an image each time. The processing unit compares an image captured each time with a predetermined image and analyze if there is a problem of light leakage for the camera module.

5 Claims, 4 Drawing Sheets

CAMERA MODULE TESTING DEVICE

BACKGROUND

1. Technical Field

The present disclosure relates to testing devices, and particularly to a camera module testing device.

2. Description of Related Art

After a processing of manufacturing a camera module, it is difficult to determine whether or not there is a problem of light leakage in the camera module.

Therefore, what is needed is a camera module testing device with means to overcome the described limitations.

DETAILED DESCRIPTION

Figure 1:
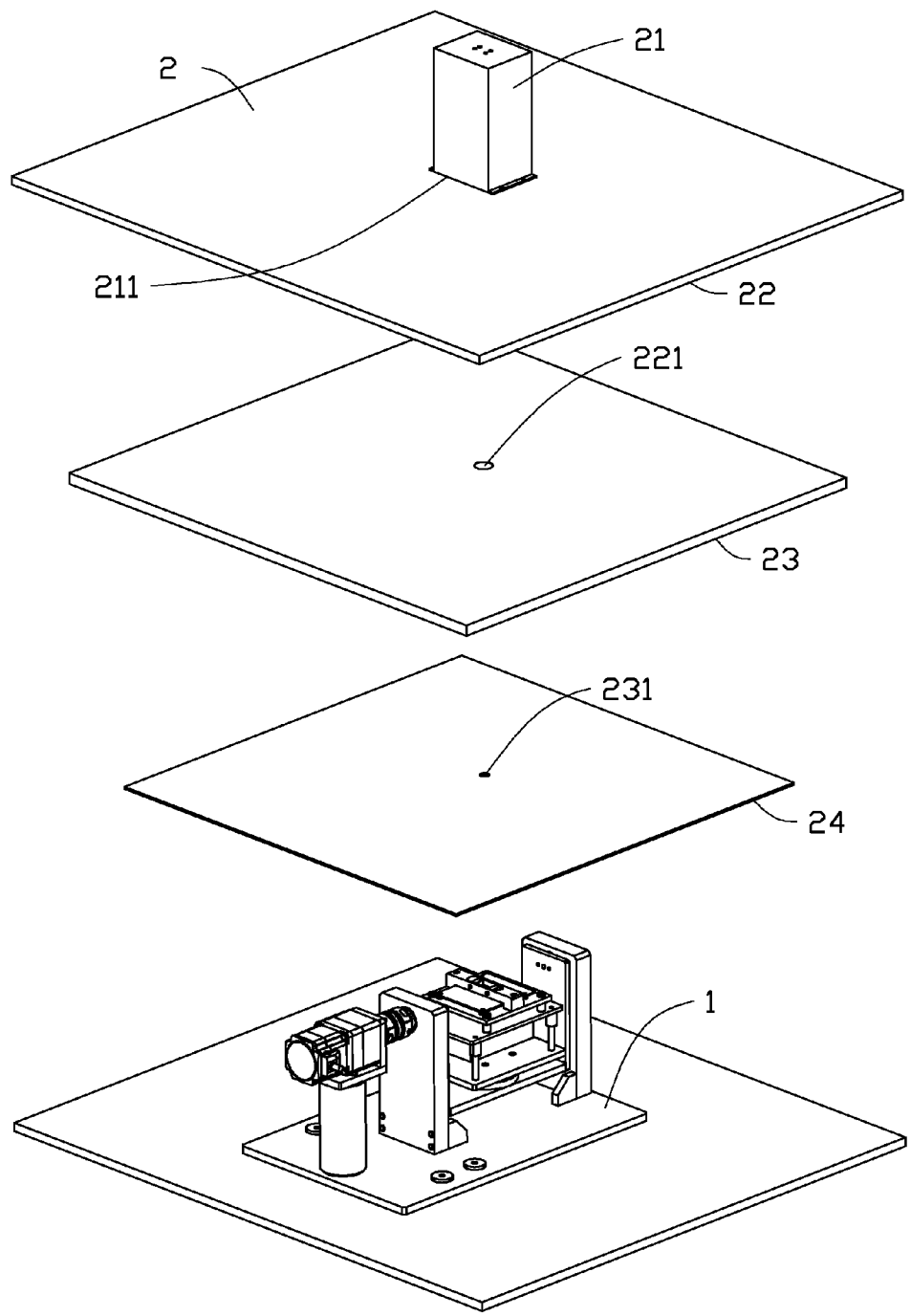
FIG. 1 is an isometric view of a camera module testing device for receiving light beams from a light source module.
Figure 2:
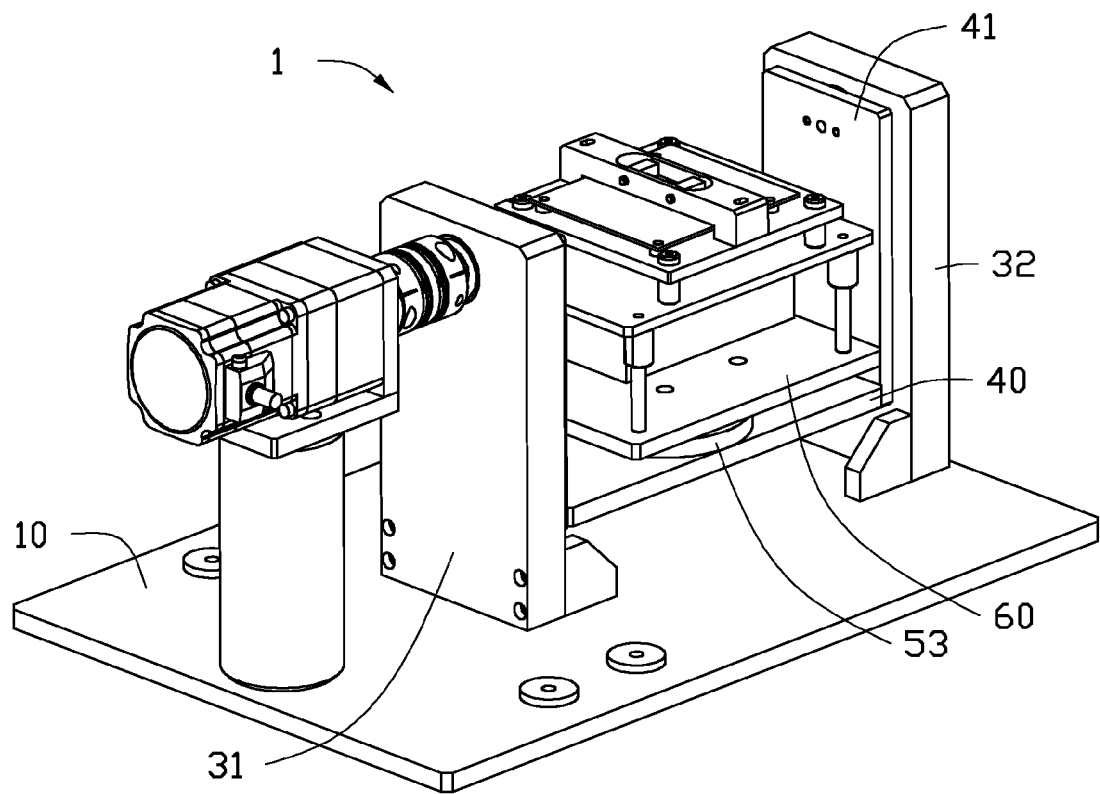
FIG. 2 is an isometric view of a camera module testing device in accordance with an exemplary embodiment.
Figure 3:
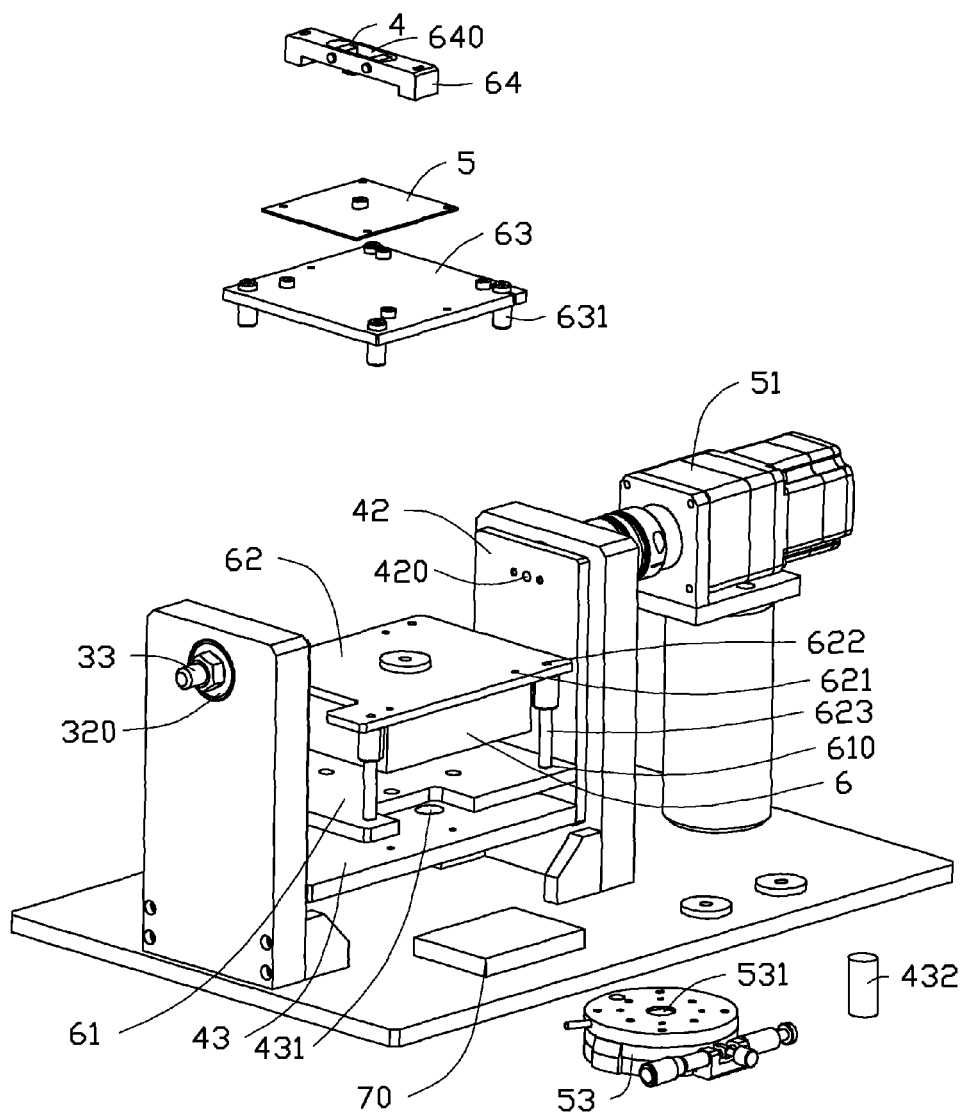
FIG. 3 is an exploded view of the camera module testing device of FIG. 1 in accordance with an exemplary embodiment.

FIGS. 1-3 show a camera module testing device 1 for detecting light leakage in or from a camera module. The camera module testing device 1 includes a base 10, a first fixing plate 31 fixed on the base 10, a second fixing plate 32 opposite to the first fixing plate 31 and fixed on the base 10, and a movable element 40. The movable element 40 includes a first movable plate 42, a second movable plate 41 opposite to the first movable plate 42, and a third movable plate 43 connected between the first movable plate 42 and the second movable plate 41. The first movable plate 42 is rotatably connected to the first fixing plate 31. The second movable plate 41 is rotatably connected to the second fixing plate 32.

The camera module testing device 1 further includes a stepping motor 51, a sliding table rotatably connected to the third movable plate 43, a support mechanism 60 placed on the sliding table 53, and a processing unit 70. The stepping motor 51 drives the movable element 40 to rotate relative to the first fixing plate 31 and the second fixing plate 32. The support mechanism 60 supports a printed circuit board (PCB) 5, a camera module 4 attached on the PCB 5, and a power supply module 6 for providing power.

The first fixing plate 31 and the second fixing plate 32 define a first axle hole 320. The first movable plate 42 and the second movable plate 43 define a second axle hole 420 aligned with the first axle hole 320. One end of the stepping motor 51 passes through the first axle hole 320 and the second axle hole 420 to rotatably connect the stepping motor 51 to the first fixing plate 31 and the first movable plate 42.

The camera module testing device 1 further includes a third screw 33. The third screw 33 passes through the first axle hole 320 of the second fixing plate 32 and the second axle hole 420 of the second movable plate 41 to rotatably connect the second movable plate 41 to the second fixing plate 32.

The support mechanism 60 includes a first support board 61, a second support board 62 placed on the first support board 61, a third support board 63 placed on the second support board 62, and a support block 64 fixed on the third support board 63. A third axle hole 531 is defined at a centre of the sliding table 53. The third movable plate 43 defines a fourth axle hole 431 aligned with the third axle hole 531. A shaft 432 passes through the third axle hole 531 and the fourth axle hole 431 to rotatably connect the sliding table 53 to the third movable plate 43. In one embodiment, the sliding table 53 is a well known mechanism, and is rotatable relative to the first support board 61 by an external force, so a detailed description of the sliding table 53 is omitted. The power supply module 6 is fixed to a lower surface of the second support board 62. The PCB 5 is placed on the third support board 63. The support block 64 defines a perforation 640 for receiving the camera module 4. The PCB 5 is electrically connected to the camera module 4 by the perforation 640. The power supply module 6 is electrically connected to the PCB 5 by a wire, thereby providing power for the camera module 4 by the PCB 5.

In one embodiment, each of four corners of the second support board 62 define a first threaded hole 621. The camera module testing device 1 further includes four first screws 631. The four first screws 631 pass through the four first threaded holes 621 to fix the third support board 63 on the second support board 62. Each of four corners of the first support board 61 also defines a blind hole 610. The second support board 62 defines four second threaded holes 622 aligned with the four blind holes 610. The camera module testing device 1 further includes four second screws 623. One end of each of the four second screws 623 is received in the four blind holes 610, while another end of each of the four second screws 623 pass through the four second threaded holes 622 to fix the second support board 62 on the first support board 61.

The camera module 4 receives light beam from the light source module 2 in the process of capturing an image. In one embodiment, the light source module 2 includes a first light guide plate 22, a light source 21 placed on the first light guide plate 22, a second light guide plate 23 placed below the first light guide plate 22 and parallel to the first light guide plate 22, and a third light guide plate 24 placed below the second light guide plate 23 and parallel to the second light guide plate 23. The first light guide plate 22 defines a first through hole 211, the second light guide plate 23 defines a second through hole 221 aligned with the first through hole 211, and the third light guide plate 24 defines a third through hole 231 aligned with the second through hole 221. The light source 21 emits light beam. The light beam passes through the first through hole 211, the second through hole 221, and the third through hole 231 and is converged into a parallel light beam the camera module 4.

Figure 4:
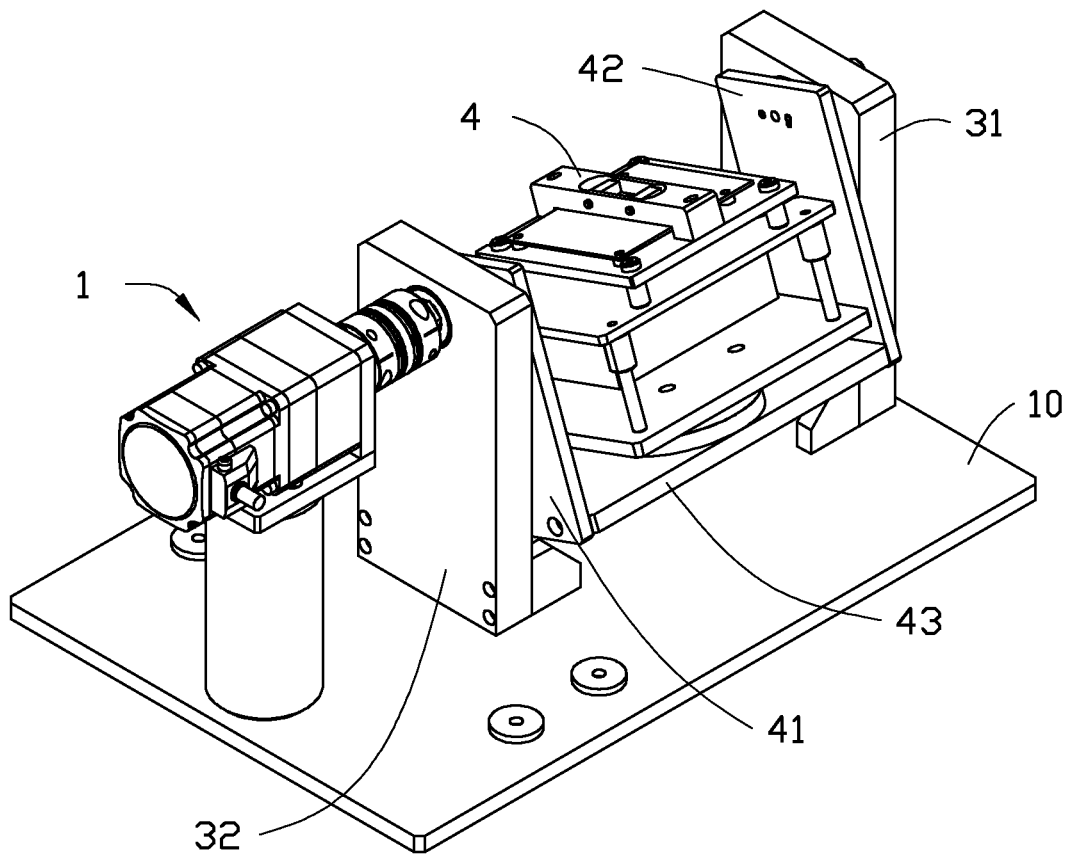
FIG. 4 is a schematic diagram of the camera module testing device when detecting light leakage for a camera module.

Referring to FIG. 4, when detecting any light leakage for the camera module 4, the sliding table 53 is driven by an external force to rotate. The support mechanism 60 and the camera module 4 are driven by the sliding table 53 to rotate relative to the third movable plate 43, to a number of different predetermined angles. When the camera module 4 is rotated to each predetermined angle, the movable element 40, the support mechanism 60 and the camera module 4 are driven by the stepping motor 51 to swing relative to the first fixing plate 31 and the second fixing plate 32 a predetermined number of times. The camera module 4 captures an image captured each time. The processing unit 70 compares an image each time with a predetermined image to analyze if there is a problem of light leakage for the camera module 4.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A camera module testing device, comprising:
a base;
a first fixing plate placed on the base;
a second fixing plate opposite to the first fixing plate and placed on the base;
a movable element comprising:
   a first movable plate rotatably connected to the first fixing plate;
   a second movable plate opposite to the first movable plate, and rotatably connected to the second fixing plate; and
   a third movable plate connected between the first movable plate and the second movable plate;
a stepping motor configured to drive the movable element to rotate relative to the first fixing plate and the second fixing plate;
a sliding table rotatably connected to the third movable plate;
a support mechanism fixed on the sliding table and configured to support a printed circuit board (PCB), a power supply module, and a camera module attached on the PCB, wherein the power supply module is configured to provide power for the PCB and the camera module; and
a processing unit;
wherein the sliding table is configured to rotate the support mechanism and the camera module to a plurality of different predetermined angles, the stepping motor drives the movable element, the support mechanism and the camera module to swing a predetermined number of times relative to the first fixing plate and the second fixing plate at each predetermined angle, the lens module captures an image each time, the processing unit compares an image captured each time with a predetermined image, and analyzing if there is a problem of light leakage for the camera module.

2. The camera module testing device as described in claim 1, wherein the support mechanism comprises a first support board fixed on the sliding table, a second support board fixed on the first support board, a third support board placed on the second support board, and a support block fixed on the third support board, the power supply module is fixed on a lower surface of the second support board, the PCB is placed on the third support board, the support block defines a perforation, the camera module is received in the perforation, and electronically connected to the PCB, the power supply module is electronically connected to the PCB.

3. The camera module testing device as described in claim 2, wherein each of four corners of the second support board define a first threaded hole, the camera module testing device further comprises four first screws, the four first screws pass through the four first threaded holes to fix the third support board on the second support board.

4. The camera module testing device as described in claim 2, wherein each of four corners of the first support board define a blind hole, the second support board defines four second threaded holes aligned with the four blind holes, the camera module testing device further comprises four second screws, one end of each of the four second screws is received in the blind hole, while another end of each of the four second screws passes through the second threaded hole to fix the second support board on the first support board.

5. The camera module testing device as described in claim 1, wherein the first fixing plate and the second fixing plate define a first axle hole, the first movable plate and the second movable plate define a second axle hole aligned with the first axle hole, one end of the stepping motor passes through the first axle hole of the first fixing plate and the second axle hole of the first movable plate to rotatably connect the stepping motor to the first fixing plate and the first movable plate, the camera module testing device further comprises a third screw, the third screw passes through the first axle hole of the second fixing plate and the second axle hole of the second movable plate to rotatably connect the second movable plate to the second fixing plate.

* * * * *